United States Patent

Lawless et al.

[11] Patent Number: 5,818,469
[45] Date of Patent: Oct. 6, 1998

[54] GRAPHICS INTERFACE PROCESSING METHODOLOGY IN SYMMETRIC MULTIPROCESSING OR DISTRIBUTED NETWORK ENVIRONMENTS

[75] Inventors: John Joseph Lawless, Round Rock; Bimal Poddar, Austin; Alice Elizabeth Putney, Round Rock; Harald Jean Smit, Austin, all of Tex.

[73] Assignee: International Business Machines Corporation, Armonk, N.Y.

[21] Appl. No.: 827,740

[22] Filed: Apr. 10, 1997

[51] Int. Cl.$^6$ .................................................. G06F 15/00
[52] U.S. Cl. ........................ 345/522; 345/433; 345/514; 345/505
[58] Field of Search .................................... 345/501, 522, 345/523, 526, 514, 502, 505, 433

[56] References Cited

U.S. PATENT DOCUMENTS

| | | | |
|---|---|---|---|
| 5,185,599 | 2/1993 | Doornink et al. | 345/516 |
| 5,230,039 | 7/1993 | Grossman et al. | 345/430 |
| 5,251,322 | 10/1993 | Doyle et al. | 345/501 |
| 5,315,698 | 5/1994 | Case et al. | 345/522 |
| 5,321,810 | 6/1994 | Case et al. | 345/515 |
| 5,481,669 | 1/1996 | Poulton et al. | 345/505 |
| 5,509,115 | 4/1996 | Butterfield et al. | 345/418 |
| 5,548,694 | 8/1996 | Frisken et al. | 345/424 |
| 5,550,962 | 8/1996 | Nakamura et al. | 345/433 |
| 5,594,854 | 1/1997 | Baldwin et al. | 345/506 |

*Primary Examiner*—Kee M. Tung
*Attorney, Agent, or Firm*—Volel Emile

[57] ABSTRACT

A method and implementing multiprocessor computer system 200 in which graphics applications 101 are executed in conjunction with a graphics interface 103 to graphics hardware 115. The methodology is also applicable to an implementing distributed network system. A master thread 105, or master node in a distributed network system, receives commands from a graphics application 101 and assembles 313 the commands into workgroups with an associated workgroup control block 315 and a synchronization tag 317. For each workgroup, the master thread flags changes in the associated workgroup control block. At the end of each workgroup, the master thread copies the changed attributes into the associated workgroup control block 319. The workgroup control blocks are scanned 403 by the rendering threads, or rendering node in a distributed network system, and unprocessed workgroups are locked 406, and the rendering threads attribute state is updated 413 from the previous workgroup control blocks. Once the rendering thread has updated its attributes, it has the necessary state to independently process the workgroup, thus allowing parallel execution. A synchronizer thread reorders the graphics datastream, created by the rendering threads, using the synchronization tags and sequentially sends the resultant data to the graphics hardware 115.

19 Claims, 4 Drawing Sheets

5,818,469

GRAPHICS INTERFACE PROCESSING METHODOLOGY IN SYMMETRIC MULTIPROCESSING OR DISTRIBUTED NETWORK ENVIRONMENTS

FIELD OF THE INVENTION

The present invention relates generally to information processing systems and more particularly to an improved graphics processing method and apparatus for multiprocessor or distributed network computer graphics systems supporting an OpenGL or similar graphics programming interface.

BACKGROUND OF THE INVENTION

System graphics technologies are developing at increasingly faster pace in order to keep up with the great demand for graphics displays and visual enhancements for almost all computer applications in many fields of endeavor. To a great extent, current developments are driven by increasing demand for, and use of, computer-aided design (CAD) applications, computer-aided manufacturing (CAM) applications and computer aided-engineering (CAE) tools. The increasing sophistication of these applications and tools requires faster and faster processing times for the applications and tools to remain useful. Also, the development of additional programming capabilities and enhanced visual effects creates additional demand for more expansive data handling capabilities and faster system processing speeds.

In response to these demands, symmetric multiprocessor (SMP) data processing systems have been employed to improve overall system performance and support enhanced graphics capabilities. In general, overall system performance is improved by providing multiple processors to allow multiple applications or programs to execute simultaneously on the same data or information processing system. In networks, the computer that may display the graphics created by a user, i.e. the server computer, may not be the same computer upon which the drawing commands are created, i.e. the client computer. Such systems utilizing a standard graphics application interface, such as the "OpenGL" graphics interface for example, can be implemented on many different hardware platforms. However, efforts to accomplish parallel execution of a single "OpenGL" or similar graphics interface application on a plurality of processors have not been totally successful.

A number of difficulties must be overcome in order to build a system that outperforms a uniprocessor implementation. In a graphics parallel processing environment, each thread running on an individual processor needs to be working constantly in order to obtain maximum system performance. Each individual processor can be one of the processors in an SMP system or one of the nodes of a distributed network system. In addition, each thread typically receives only a portion of a graphics datastream, yet each thread needs access to the entire graphics datastream in order to maintain correct attribute state. Further, all commands must be handled in sequential order to establish the correct attribute state.

Wait conditions are problematical and cause system delays where individual threads must wait for all previous commands to be processed. Another common problem is the latency incurred in starting and stopping a parallel pipeline. Operations that cause a pipeline to stop or be interrupted must be avoided.

A graphics hardware interface system needs to be able to work efficiently for a variable number of processors in a multiprocessing environment. Thus there is a need to provide a methodology and apparatus which efficiently exploits a multiprocessor environment to optimize performance of an "OpenGL" or similar graphics interface system.

SUMMARY OF THE INVENTION

A method and implementing multiprocessor computer system in which graphics applications are executed in conjunction with a graphics interface to graphics hardware. This method is also applicable to an implementing distributed network system. The master thread, or master node in the case of a distributed network system, receives primitive and attribute commands from a graphics application and assembles the commands into workgroups with associated workgroup control blocks and synchronization tags. The master thread context is updated in accordance with graphics attribute changes. For each workgroup, the master thread flags such attribute changes in the associated workgroup control block. Unchanged attributes are maintained from an initial attribute state. At the end of a workgroup, the master thread copies the changed attributes into the workgroup control block. The workgroup control blocks are scanned by the rendering threads. When an unprocessed workgroup is detected, it is locked, and the attribute state of the rendering thread, or the rendering node in the case of a distributed network system, is updated from the previous workgroup control blocks. Once the rendering thread has updated its attributes, it has the necessary state to independently process the workgroup, thus allowing parallel execution. The synchronizer thread reorders the graphics datastream created by the rendering threads, using the synchronization tags and sequentially sends the resultant datastream to the graphics hardware.

BRIEF DESCRIPTION OF THE DRAWINGS

The novel features believed characteristic of the present invention are set forth in the claims. The invention itself, however, as well as a preferred mode of use, further objectives and advantages thereof, will best be understood by reference to the following detailed description of an illustrative embodiment when read in connection with the accompanying drawings in which:

DETAILED DESCRIPTION

Figure 1:
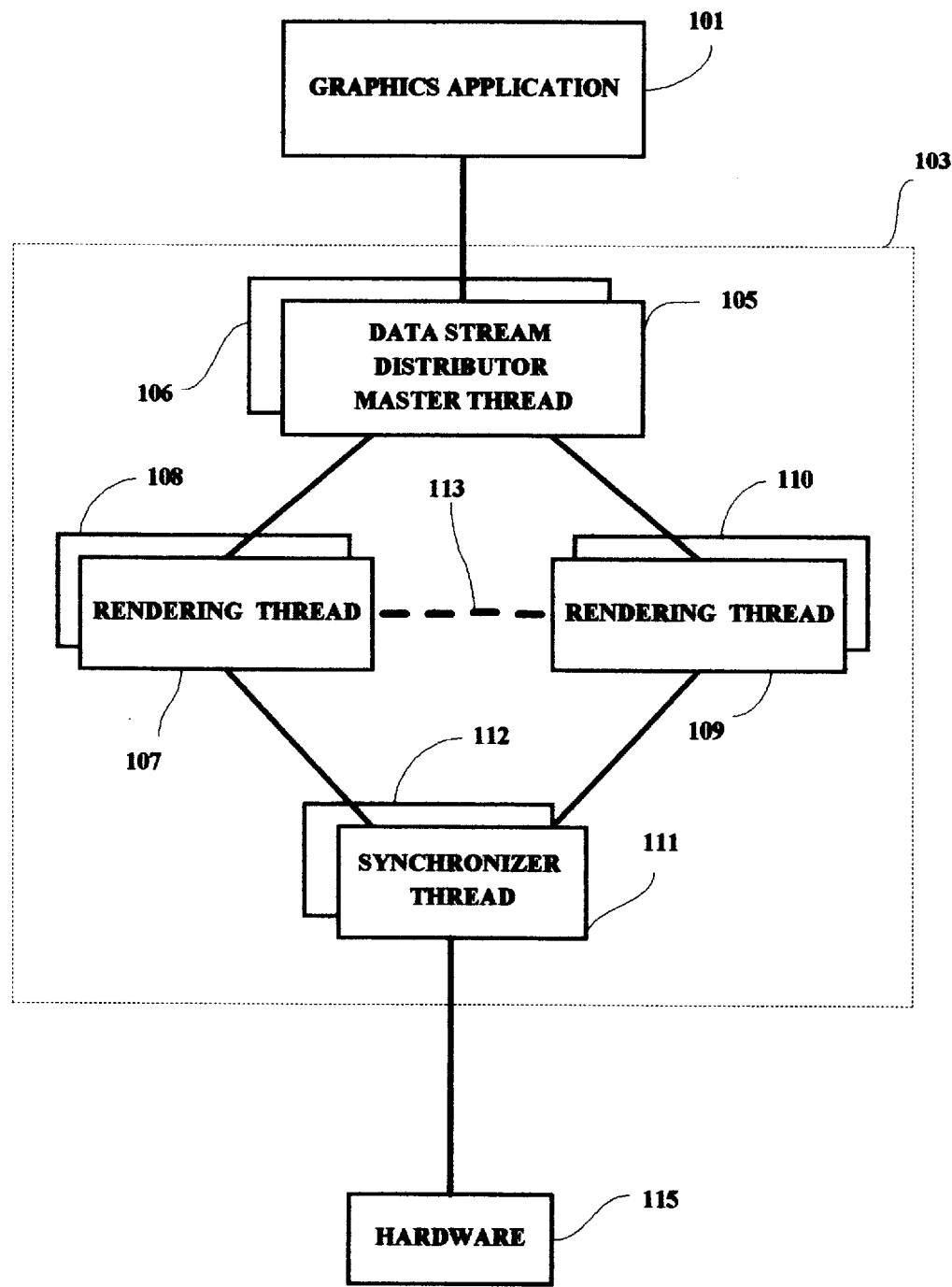
FIG. 1 is a schematic representation of a graphics architecture in accordance with the present invention.

In FIG. 1, there is shown a graphics application 101 which is typically running on a workstation or other computer system. As hereinafter noted, an exemplary system may include a plurality of workstations or computers connected in a network configuration and having a common bus which may include a plurality of central processing units or CPUs in a multiprocessing environment, and various display capabilities.

In sending graphics data and commands for display, a graphics interface 103, for example "OpenGL", receives primitive and attribute commands from application 101. A primitive defines the shape of various components of an object, such as lines, points, polygons, and text in two or three dimensions. An attribute defines a state such as linestyle, color, surface texture, material or matrices.

In the present example, the graphics application 101 is coupled to the graphics interface 103 which interfaces the application 101 or applications to an implementing hardware system 115 through a plurality of threads. A thread is a predefined program segment within a larger process or program segment and is operable to effect the accomplishment of a specified individual graphics task such as rasterizing or rendering. In the disclosed method, for a parallel processing environment, one of a plurality of threads will be a master thread 105 and is the thread through which the application 101 communicates to the interface system 103. The master thread 105, within the graphics interface, creates a plurality of threads 107, 109, to be used for rendering. One thread is designated as the synchronizer thread 111 which sorts the datastreams from all of the threads into sequential order and communicates the resultant datastream to the hardware 115. Between master thread 105 and synchronizer thread 111 are connected, in parallel, a plurality of rendering threads 113 such as thread 107 and thread 109.

Each thread maintains its own local graphics context containing the attribute state. Master thread 105 includes a local graphics context 106 associated therewith. Similarly, threads 107, 109 and 111 include related graphics contexts 108, 110 and 112, respectively, associated therewith.

The thread designated as the master thread 105 operates as a datastream distributor, receives graphics interface commands from a graphics applications 101, and sequentially bundles the primitive and attribute commands into workgroups for future processing by a rendering thread. The number of commands in each workgroup is based on the number of vertices contained in the rendering commands, and the number and size of attribute commands received and the estimated amount of processing time for a workgroup. The sizes of the workgroups are crucial in balancing the workload of the processors within a parallel system.

In the present example, the most frequently occurring function calls such as "glColor", "glNormal", "glIndex", "glEdgeflag", and "glTexCoord", are not executed immediately upon receipt, but rather a pointer is stored to the function call information in the workgroup, and at the end of the packaging of the workgroup, the pointers are tested. If any of the pointers are set, they are processed in their entirety at that time. That method saves processing the same function call many times during the workgroup when only the last instance of each of the frequently occurring graphics interface function calls is needed.

Each graphics interface command from a user application 101 is bundled sequentially for future work by the rendering threads. Each workgroup is distinguished by a synchronization tag which is used and referred to by the synchronizer thread 111 for sequential ordering of the datastream. For each attribute command that is received, the master thread 105 updates the state of the master graphics context 106, flags the particular change, and places the command in a workgroup. At the end of a workgroup, the master thread 105 copies the attribute state that has changed within that workgroup from the master thread's graphics context 106 to a workgroup control block.

Workgroup control blocks contain information needed by the rendering threads 107, 109, to select the workgroup for processing and updating the thread's attributes to the state at the beginning of the workgroup. The key pieces of the workgroup control block are the pointers to the bundled primitive and attribute commands, the attribute change flags, the changed attribute state, the synchronization tag, and a lock. The lock is used to ensure that only one rendering thread may process the workgroup. The master thread sets all of this information except for the lock.

The rendering threads 107,109 scan the list of workgroup control blocks and lock the first unprocessed workgroup, so no other thread will process the same workgroup. Before processing can begin on the locked workgroup, the thread's attribute state must correspond to the beginning of the locked workgroup, i.e. the attribute state as if this thread had processed all previous commands. To accomplish the acquisition of the required attribute state, the rendering thread scans the list of workgroup control blocks in reverse order from the workgroup it has just locked, updating its local attribute state from the attributes that have been marked by the flags in each of the workgroup control blocks. In the process of scanning back, once an attribute is updated locally, the thread will not update that attribute again. The thread continues this process until all attributes have been updated and the thread reaches the last workgroup processed by this thread.

With the technique described above, only the most recent attribute changes are updated in the rendering thread's local attribute state. The rendering threads do not incur delays associated with updating attributes every time attributes are changed but rather only when individual threads require access to the updated attributes does the updating process occur and then only with regard to the required attributes. This method efficiently updates attributes needed by the rendering threads without having to process all previous workgroups.

After the attributes have been updated, the thread marks the workgroup control block as scanned by the thread. In order for the workgroup control block to be reused by the master thread, all of the rendering threads must mark the workgroup control block as processed. The flagging of attributes by the master thread and updating of the local state by the rendering threads is a key element and enables the packeting of work for rendering threads, and also the ability of the rendering threads to work in parallel.

The rendering threads create a datastream contained in queues which are directly sent to the graphics hardware 115. The datastream is created asynchronously between the threads, since one rendering thread may be working faster or slower than another. Each rendering thread has a set of queues with associated headers containing information about the queue and a synchronization tag. To accomplish the desired ordering, the synchronizer thread 111 scans the queue headers of all the rendering threads for the next synchronization tag. The resultant datastream is temporally ordered by the synchronizer thread 111 and sent to the graphics hardware 115 for proper rendering.

Figure 2:
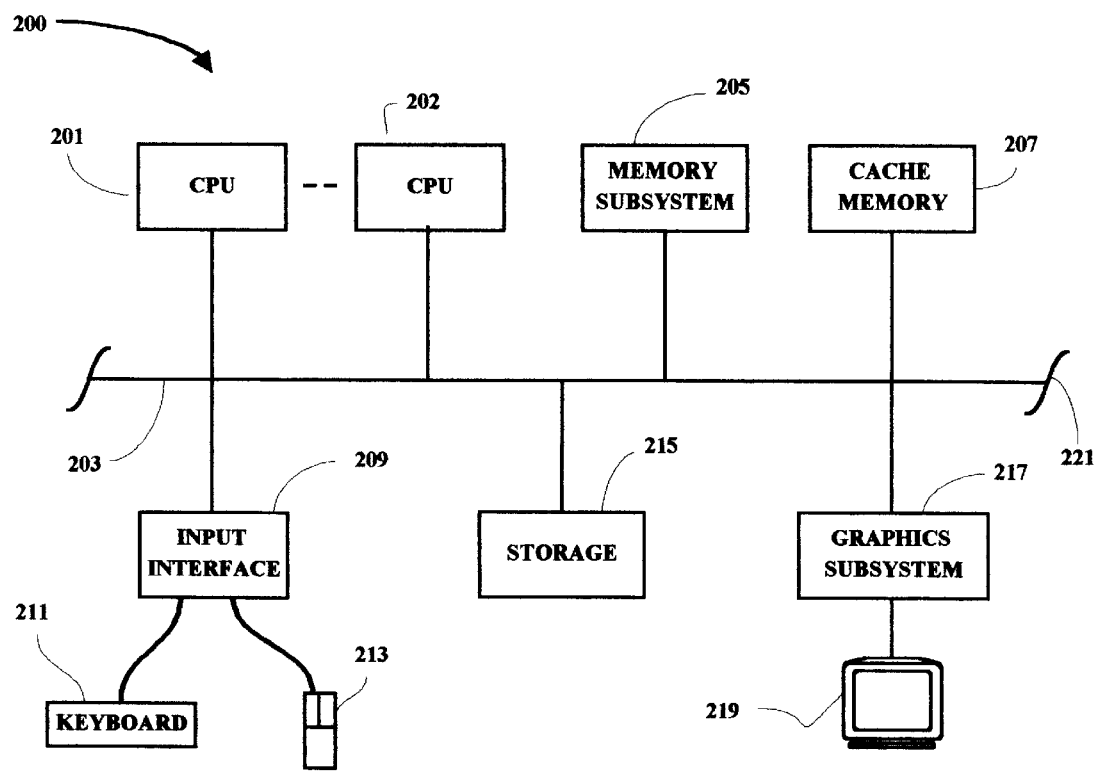
FIG. 2 is a simplified schematic drawing of a multiprocessor computer system in which the present invention may be implemented.

In FIG. 2, an exemplary system 200 is illustrated for implementing the processing methods disclosed herein. The graphics subsystem 217 corresponds to the hardware 115 block illustrated in FIG. 1. FIG. 2 depicts a simplified block diagram of selected components in an information processing or data processing system. The processing system includes a central processing unit (CPU) or processor 201 connected to a central bus 203. A second processor 202 is also shown connected to the bus 203. The system may also include additional processors connected to the central bus 203. The illustrated system is an example of a symmetric multiprocessor (SMP) architecture having a plurality of processors servicing the system. Additionally, a plurality of such systems could be connected together to form a distributed network system. Further, the central bus arrangement illustrated in the present example may also be implemented in other arrangements including but not limited to a peripheral component interconnect (PCI) local bus.

The exemplary processing system includes a memory subsystem 205 and a cache memory 207 connected to the bus 203. The memory subsystem typically includes a memory controller and system RAM memory. Also connected to the bus 203 is a storage block 215 which may include one or more of several storage function devices including but not limited to floppy disk drives, hard drives, tape drives, flash memory, etc. An input interface device 209 applies inputs from one or more input devices, such as a keyboard 211 and a mouse 213, to the bus 203. The system also includes a display device 219 which is connected through a graphics subsystem 217 to the bus 203. The graphics subsystem 217 typically includes an internal graphics processor as well as a frame buffer memory for use in connection with the display device. For example, the graphics subsystem 217 generally includes rasterization hardware as well as other specific graphics engines. The bus 203 may be extended 221 to be connected to other system and/or station devices in a network or other configuration. Instructions for performing the processes and methods of the present invention may be executed by the processors 201 and 202 and/or a separate graphics processor within the graphics subsystem 217. Such instructions may be embodied within or stored in any one of, or a combination of, storage devices and/or memory devices including RAM memory within the memory subsystem 205, any of the possible storage elements of the storage block 215 or any of a number of portable storage devices such as floppy disks or CDs.

Figure 3:
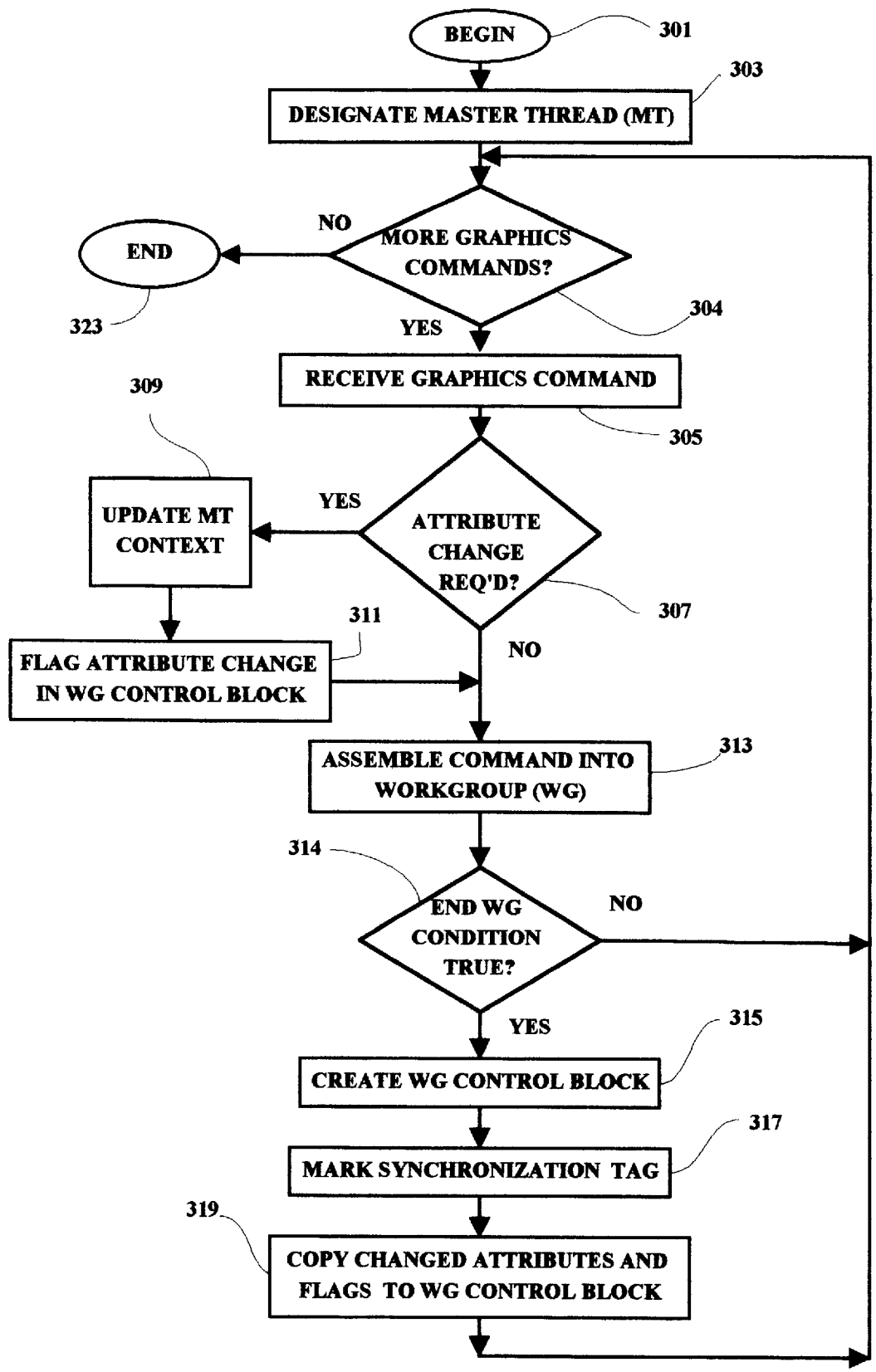
FIG. 3 is a flowchart illustrating a high level flow sequence of workgroup creation methodology disclosed herein.

The flowchart of FIG. 3 illustrates the graphics processing methods as implemented by the master thread 105, including the creation of workgroups. Initially 301 a master thread is designated 303 as hereinbefore discussed. A determination is made 304 as to whether any graphics commands have been generated. When a graphics application command is detected, the command is received 305 by the master thread 105, and a determination is made 307 as to whether an attribute change is required for the particular command received. If an attribute change is required, the master thread context 106 is updated 309 and the attribute change is flagged in a workgroup control block 311 by the master thread. After the attribute change has been made, or if no attribute change is required 307, the master thread assembles the attribute command into a workgroup 313 as herein before described. A determination is then made as to whether an "END WORKGROUP" condition is true 314. If the workgroup (WG) is not ended, the process returns to detect subsequent graphics commands 304. If the WG is to be ended 314, the master thread then creates a workgroup control block 315 and a synchronization tag 317 in accordance with the order in which the workgroup was created. The master thread updates the changed attribute 319, if any, and awaits 304 the receipt of another graphics command from the application 101. When there are no more graphics commands such as when the application program has terminated, the illustrated process ends 323.

Figure 4:
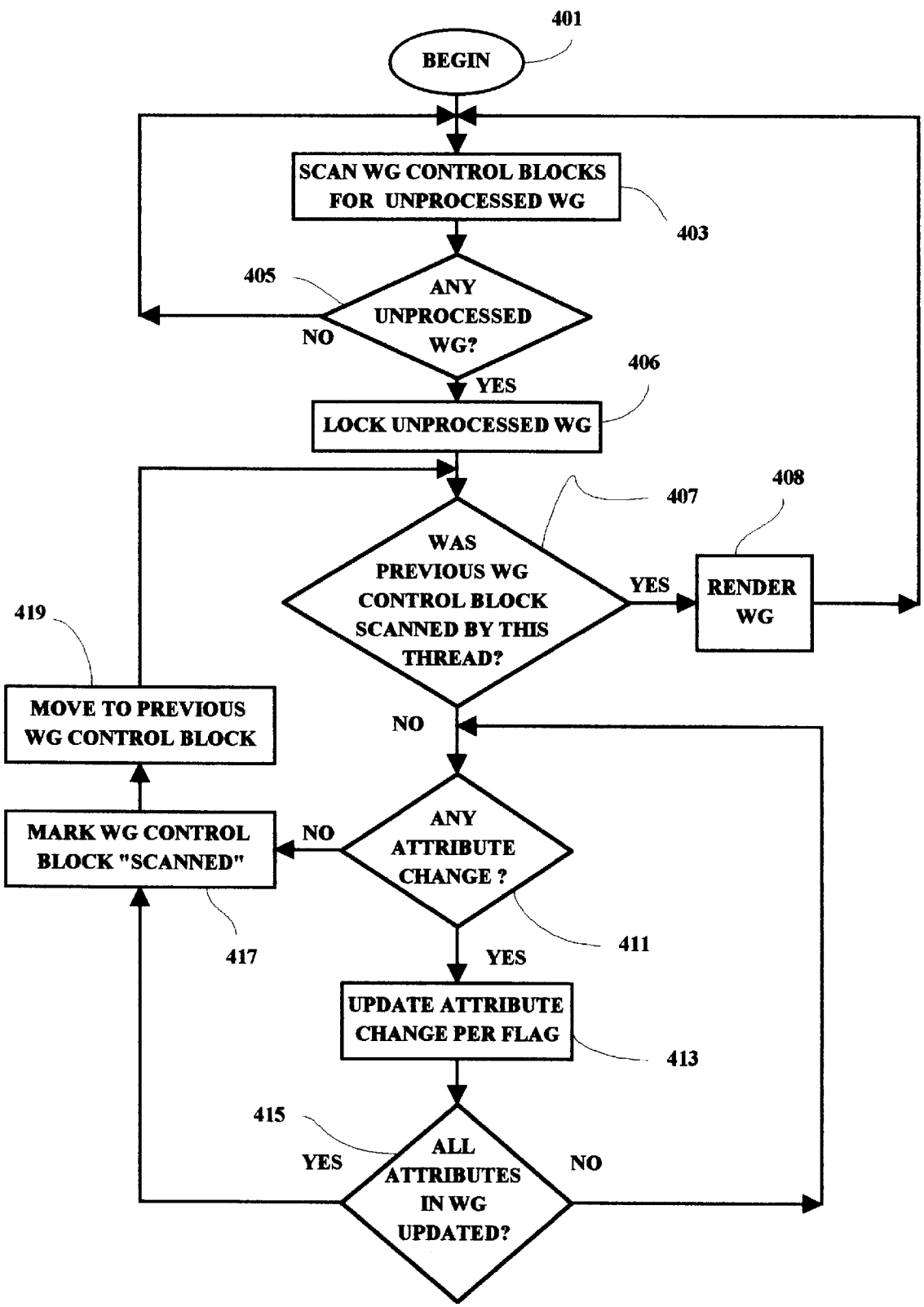
FIG. 4 is a flowchart illustrating workgroup selection and attribute updating methodology in accordance with the present invention.

In FIG. 4, the methodology as implemented by the rendering threads is illustrated, including functional descriptions of rendering threads, workgroup selection and attribute updates. When a rendering thread is initiated 401 the workgroup control blocks are scanned 403 and a determination is made as to whether there are unprocessed workgroups 405. When an unprocessed workgroup is identified, that workgroup is locked 406 and the attributes are updated using the workgroup control blocks in reverse order 407 to obtain the most recent attribute changes. If the previous workgroup control block had been scanned by the current thread 407, then the workgroup (WG) is rendered 408 and the process returns to scan WG control blocks for unprocessed workgroups. If a previous WG control block was not scanned by the current thread 407, a determination is made as to whether there is an attribute change 411. When an attribute change is detected 411, a flag noting the change is cleared 413 and a determination is made 415 as to whether all changed attributes in the workgroup have been updated. If there are other attribute changes in the workgroup that have not been updated, then the process repeats to update the changes 413 until all of the changed attributes have been updated 415. At that point, or if there are no additional attribute changes detected 411, the workgroup is marked as scanned 417. The thread repeats the process until all previous workgroup control blocks are marked as scanned. The rendering thread is now ready to process the locked workgroup. The flagging 311 of attributes by the master thread 105 and the updating 413 of the local state by the rendering threads e.g. threads 107 and 109, enables the packeting of work for the rendering threads and also enable the rendering threads to work in parallel.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, programmed into system memories and/or transportable and readable media for use with a plurality of systems, and/or also included or integrated into a CPU or other larger system integrated circuit or functional chip such as a graphics chip or graphics board or subsystem. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method of processing commands received from a software application by a graphics interface, the graphics interface being selectively operable to provide output datastreams for application to a graphics hardware subsystem, said method comprising:

receiving commands from the software application by a master thread within the graphics interface;

updating a master thread context for attribute changes in said commands;

assembling the commands into workgroups having associated workgroup control blocks;

copying said attribute changes to said workgroup control blocks;

scanning said workgroup control blocks by rendering threads whereby said rendering threads are updated with attribute changes; and sending said output datastreams created by said rendering threads to the graphics hardware subsystem.

2. The method as set forth in claim 1 wherein said assembling further includes marking synchronization tags in said workgroup control blocks, said synchronization tags being indicative of the sequence in which said commands were received.

3. The method as set forth in claim 2 and, after said scanning, said method further including:

sequencing said output datastreams in accordance with said synchronization tags.

4. The method as set forth in claim 3 wherein after said updating, said method further includes:

creating a workgroup control block; and flagging said attribute changes in said workgroup control block.

5. The method as set forth in claim 3 wherein after said scanning, said method further includes:

locking said workgroup control blocks until after said rendering threads have been updated.

6. The method as set forth in claim 5 wherein said rendering thread attributes are updated in reverse order from previous workgroup control blocks.

7. The method as set forth in claim 2 wherein after said updating, said method further includes:

creating a workgroup control block; and flagging said attribute changes in said workgroup control block.

8. The method as set forth in claim 2 wherein after said scanning, said method further includes:

locking said workgroup control blocks until after said rendering threads have been updated.

9. The method as set forth in claim 8 wherein said rendering thread attributes are updated in reverse order from previous workgroup control blocks.

10. The method as set forth in claim 1 wherein after said updating, said method further includes:

creating a workgroup control block; and flagging said attribute changes in said workgroup control block.

11. The method as set forth in claim 10 wherein after said scanning, said method further includes:

locking said workgroup control blocks until after said rendering threads have been updated.

12. The method as set forth in claim 11 wherein said rendering thread attributes are updated in reverse order from previous workgroup control blocks.

13. The method as set forth in claim 1 wherein after said scanning, said method further includes:

locking said workgroup control blocks until after said rendering threads have completed processing of said workgroups.

14. The method as set forth in claim 13 wherein said rendering thread attributes are updated in reverse order from previous workgroup control blocks.

15. A storage medium including machine readable indicia, said storage medium being selectively coupled to a reading device, said reading device being selectively coupled to processing circuitry, said reading device being selectively operable to read said machine readable indicia and provide program signals representative thereof, said program signals being effective to cause said processing circuitry to interface a software application with a graphics hardware subsystem associated with said processing circuitry, said program signals being selectively operable to cause said processing circuitry to provide output data streams for application to said graphics hardware subsystem by performing the steps of:

receiving commands from the software application by a master thread using the graphics interface;

updating a master thread context for attribute changes in said commands;

assembling the commands into workgroups having associated workgroup control blocks;

copying said attribute changes to said workgroup control blocks;

scanning said workgroup control blocks by rendering threads whereby said rendering threads are updated with attribute changes; and sending said output datastreams created by said rendering threads to the graphics hardware subsystem.

16. The medium as set forth in claim 15 wherein said medium comprises a magnetic diskette.

17. The medium as set forth in claim 15 wherein said medium comprises a CD-ROM.

18. An information processing system comprising:

a plurality of processing circuits;

a memory device for use in conjunction with said processing circuits, said memory device being selectively operable for storing a software application;

a bus system connecting said processing circuits and said memory device;

a graphics hardware subsystem connected to said bus system; and an interface element, said interface element being selectively operable for receiving commands from said software application to provide output data streams for application to said graphics hardware subsystem, said interface element being further selectively operable for:

updating a master thread context for attribute changes in said commands;

assembling the commands into workgroups having associated workgroup control blocks;

copying said attribute changes to said workgroup control blocks;

scanning said workgroup control blocks by rendering threads whereby said rendering threads are updated with attribute changes; and sending said output datastreams created by said rendering threads to the graphics hardware subsystem, said rendering threads being executed in parallel by said processing circuits.

19. The information processing circuit as set forth in claim 18 wherein said interface element is a software interface.

* * * * *